United States Patent [19]

Warner

[11] 4,079,225
[45] Mar. 14, 1978

[54] FIBER OPTIC/PHOTON DETECTOR FOR BRAZING MACHINE

[76] Inventor: Allan S. Warner, 50 Haliday St., Clark, N.J. 07066

[21] Appl. No.: 711,465

[22] Filed: Aug. 4, 1976

[51] Int. Cl.² .......................................... B23K 11/24
[52] U.S. Cl. .................. 219/110; 350/96.10
[58] Field of Search ............. 219/108, 109, 110, 78; 250/227; 350/96 R, 96 B; 356/43, 44

[56] References Cited

U.S. PATENT DOCUMENTS

| | | | |
|---|---|---|---|
| 2,113,450 | 4/1938 | Lasky et al. | 356/43 |
| 3,045,103 | 7/1962 | Warner | 219/78 |
| 3,191,441 | 6/1965 | Erickson | 219/110 |
| 3,273,447 | 9/1966 | Frank | 350/96 R |
| 3,406,272 | 10/1968 | Ehrlich | 219/108 |
| 3,440,389 | 4/1969 | Meyer | 219/110 |
| 3,475,612 | 10/1969 | Stupar et al. | 250/227 |
| 3,496,327 | 2/1970 | Vilkas | 219/110 |
| 3,590,201 | 6/1971 | Basinger | 250/227 |
| 3,778,581 | 12/1973 | Denny | 219/110 |

FOREIGN PATENT DOCUMENTS

2,445,132  3/1975  Germany .................. 219/110

*Primary Examiner*—J. V. Truhe
*Assistant Examiner*—Clifford C. Shaw
*Attorney, Agent, or Firm*—Lerner, David, Littenberg & Samuel

[57] ABSTRACT

Apparatus for controlling the quality of a joint between electric motor armature wires and corresponding commutator bars is disclosed, including means for heating the armature wires and the commutator bars at the points where they are to be joined, means for bringing the armature wires and commutator bars into contact with the means for heating them, fiber optic means for determining the temperature at a point relative to said joint by collecting the radiant energy emitted from that point, means for converting the radiant energy into a usable electronic signal, and means for terminating the means for heating the armature wires and commutator bars in response to said electronic signal when the temperature at that joint reaches a predetermined temperature. In a preferred embodiment, the means for heating the armature wire and the commutator bar comprises a fusing electrode and a grounding electrode, and the apparatus also includes timing means for measuring the length of time that the armature wire and commutator bar are in contact with said means for heating the armature wire and commutator bar is actuated when that length of time reaches a predetermined length of time.

Preferably, the means for converting the radiant energy collected by the fiber optic means into a usable electronic signal includes photon detection means. Furthermore, it is also preferred to employ a bifurcated fiber optic means, and a light source, so that a first branch of the bifurcated fiber optic means is used for determining the temperature at a point relative to the joint, and the second branch of the bifurcated fiber optic means is used in conjunction with the light source to illuminate the point relative to the joint in order to properly aim the fiber optic means.

7 Claims, 6 Drawing Figures

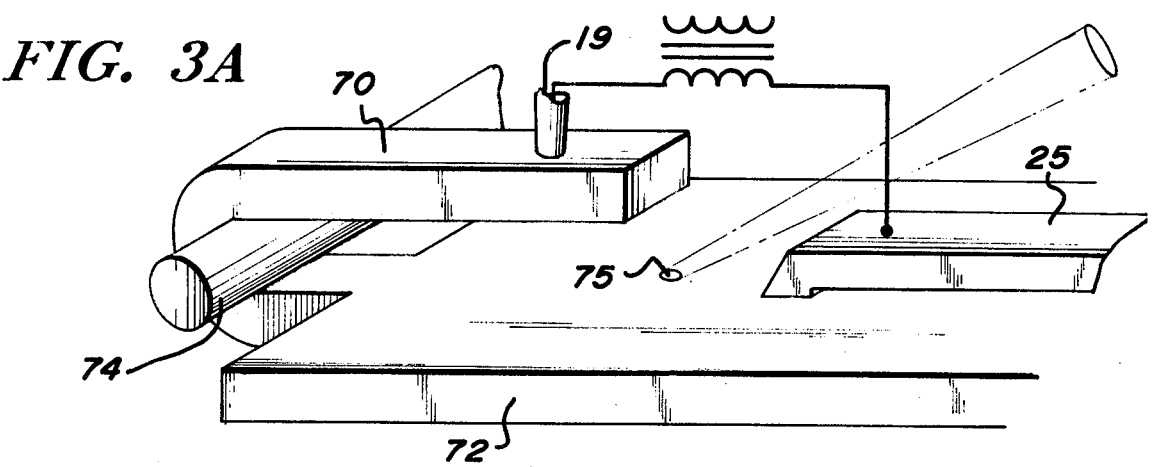
*FIG. 3A*
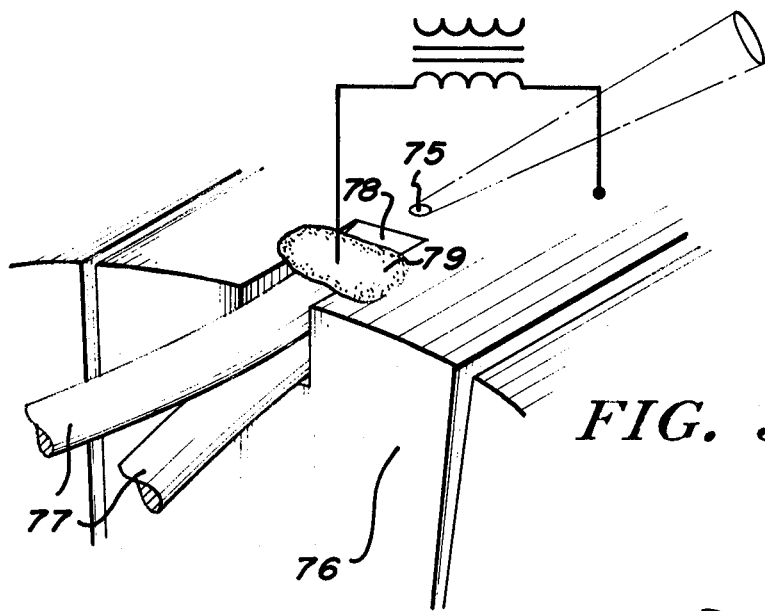
*FIG. 3B*
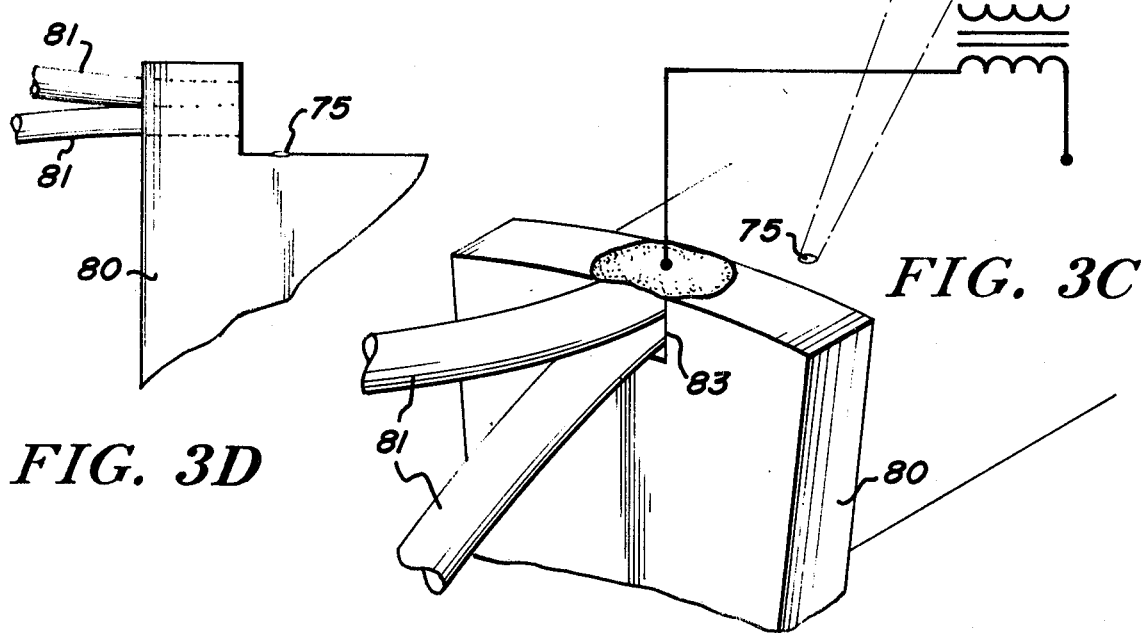
*FIG. 3C*
*FIG. 3D*

FIBER OPTIC/PHOTON DETECTOR FOR BRAZING MACHINE

FIELD OF THE INVENTION

The present invention relates to apparatus for fusing or brazing electric motor armature wires to corresponding commutator bars. More particularly, the present invention relates to means for controlling the fusing or brazing of such armature wires to such commutator bars, and to obtaining high quality, uniform joints therebetween.

BACKGROUND OF THE INVENTION

The field of producing universal or DC electric motors has been developing for many years. At the outset, soft soldering or brazing of coiled wires to commutators was employed, but the need for high quality motors which were reliable and economically attractive has resulted in the growth and increased utilization of commutator fusing to prepare such motors. Furthermore, at the same time, the development of tang-type commutators as compared to the prior slotted type to increase the ease with which the armature lead wires could be attached to the commutator bars was also developed for such purposes. An apparatus for the efficient and rapid commutator fusing of both the tang and slotted types of commutators is shown in U.S. Pat. No. 3,045,103. That apparatus has permitted the increased production of such motors on a large scale, with relatively uniform quality. Indeed, this apparatus has been used for many years on a large scale for such commutator fusing. However, with the current need for extremely fine quality control and uniform commutator fusing in such motors, when produced on a mass scale, the search has continued for means to adapt such apparatus for such purposes.

The need for such careful quality control arises from the very nature of commutator fusing itself. Thus, as compared to spot welding processes, in commutator fusing techniques, the electrodes generally employed to heat the armature wires and commutator bars are high resistance electrodes, and the parts to be fused are heated by the heat dissipated by these electrodes. Since the lead wires are normally insulated, sufficient current must be applied to the electrodes so that they can be heated to a temperature sufficient to remove the lead wire insulation, and this must be carried out for a short enough period of time so as not to damage the wires themselves. It can therefore be seen that the amount of heat brought to bear upon the joint must be controlled to a very significant degree. Similar results occur in commutator brazing, employing high temperature solder alloys.

In the past, various apparatus have been employed for thermal monitoring in a number of fields. In particular, various photo-sensitive means have been utilized to accomplish such monitoring. For example, U.S. Pat. No. 3,435,173 to Connoy et al utilizes in one embodiment thereof, induction heating through an induction heating coil to weld the ends of saw bands together. This patent employs a photo-sensitive cell to respond to light rays emanating from the weld zone as to the weld temperature rises, and subsequently to terminate current flow at the proper instant. This apparatus, however, cannot achieve anywhere near the degree of control, particularly over inaccessible locations, nor the high quality uniform product which can be achieved in accordance with the present invention.

U.S. Pat. No. 3,781,504 to Harnden, Jr. employs a bolometer to control induction cooking appliances. In particular, the patentee utilizes a hollow radiant energy propogation conduit for the transmission of temperature sensing data.

In addition, U.S. Pat. No. 2,438,160 to Green discloses an alternative apparatus for the control of swaging temperatures employing a caesium suboxide photocell to detect infrared light emitted from a rod or wire emerging from a heating furnace on its way to a swarfing machine, and U.S. Pat. No. 2,640,137 to Ketchledge discloses temperature control means in brazing operations, such as with regard to the end seals of submarine cables. The patentee in the latter case employs a photocell comparison technique, i.e., by comparing the radiations from the work and those from the lamp filament to obtain equal temperatures.

In each of these cases, however, the patentees have been employing various temperature sensitive devices to measure the intensity of the glow or emission from a metallic object upon its heating. These devices therefore generally operate upon a principal similar to that of a thermopile, that is where the radiation is measured by the electromotive force by a temperature rise between two metals. The search has therefore continued for means to not only more accurately measure the temperature of a given material, and to not be bound by the radiation of visible light therefrom, but furthermore for means to utilize this result to control fusing and brazing apparatus for the achievement of a high degree of accuracy therewith.

Finally, in "Practical Applications of Infrared Techniques" by Riccardo Vanzetti, John Wiley and Sons, 1972, the author discloses the monitoring of the metal temperature in spot welding systems by the use of optical fibers. The author then employs a photodetector, such as a silicon or PBS cell to display the measured results on an oscilloscope. Furthermore, in Chapter 4 of this book, the author discusses a number of different thermal measuring devices, similar to those shown in the "ABC's of Infrared" by Burton Bernard, Howard W. Sams and Co., 1970.

The search has, however, continued for a number of years to develop an economically feasible and efficient method for actually controlling the current commercial machinery being utilized for commutator fusing or brazing.

SUMMARY OF THE INVENTION

In accordance with the present invention, such a system has now been developed, and in particular, apparatus for controlling the quality of joints between armature wires and commutator bars has now been developed. Thus, applicants have discovered that these results can be achieved by employing means for heating the armature wires and the commutator bar at the points where they are to be joined, means for bringing the armature wire and commutator bars into contact with the means for heating the armature wires and commutator bars, fiber optic means for determining the temperature at a point relative to that joint by collecting the radiant energy emitted from that point as it is being heated, means for converting that radiant energy into a usable electronic signal, and means for terminating the means for heating both the armature wire and the commutator bar in response to that electronic signal when that temperature at the joint reaches a predetermined temperature.

In particular, it is preferred that the means for converting the radiant energy collected by the fiber optic means into a usable electronic signal includes photon detection means, and the means for terminating heating of the armature wire and commutator bars in accordance with that electrical signal comprises analog computer means.

In a preferred embodiment of the present invention, timing means are employed for measuring the length of time that the armature wires and commutator bars have been in contact with the means for heating the armature wires and commutator bars, and the means for terminating the means for heating the armature wire and commutator bar may be actuated when that length of time reaches a predetermined length of time. Thus, the apparatus will terminate fusing or brazing either when the predetermined temperature has been reached, or the predetermined length of time has expired.

In another embodiment of the present invention, the fiber optic means comprises a bifurcated fiber optic assembly, including two paths. The fiber optic assembly would thus include a first fiber optic path for transmitting the radiant energy emitted from the joint to the means for converting that radiant energy into an electronic signal, and a second fiber optic path, preferably associated with illumination means, for illuminating the point relative to the joint to be formed at which both paths of the fiber optic means are aimed. The latter thus permits aiming of the fiber optic means at a precise point relative to the joint.

In a preferred embodiment, the means for terminating the means for heating the armature wires and commutator bars includes analog processing means for utilizing the electronic signals generated by the detection means for terminating the means for heating the armature wires and commutator bars.

BRIEF DESCRIPTION OF THE DRAWINGS

Other objects, advantages and results of the present invention can be seen with reference to the following detailed description, in conjunction with the accompanying drawings, in which:

FIGS. 3 A through D are enlarged perspective views, partially schematic, of the aiming of the fiber optic means of the present invention at a point relative to the fused joint between the armature wire and combination bar.

DETAILED DESCRIPTION

Figure 1:
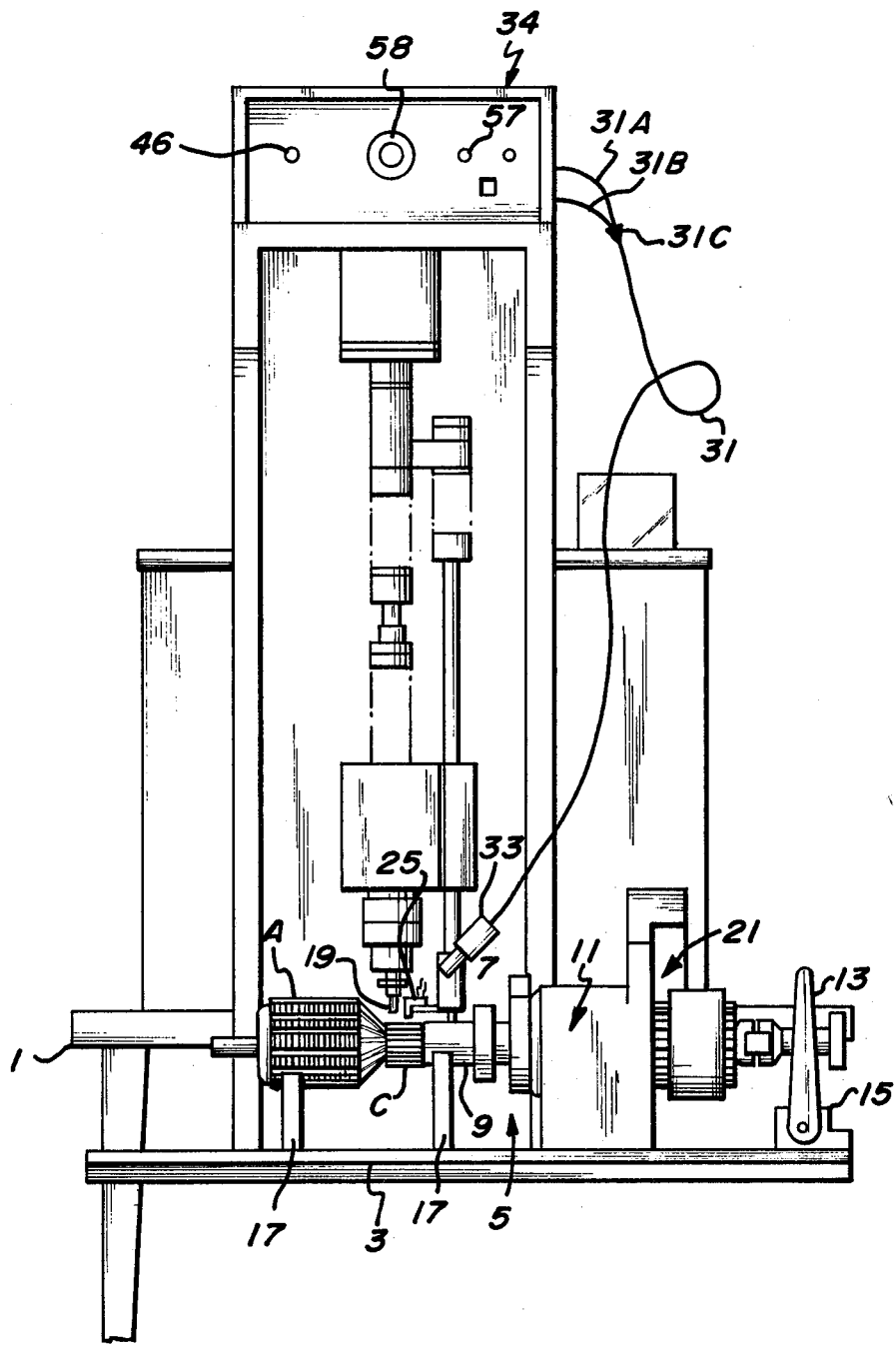
FIG. 1 is a partial front elevational view of a fusing or brazing apparatus employing the present invention.

Specifically referring to the figures, in which like numerals refer to like portions thereof, the apparatus of the present invention is employed with conventional fusing or brazing machines. The particular machine shown in FIG. 1 is of the type shown in U.S. Pat. No. 3,045,103, and the overall description of the details of that apparatus contained in that U.S. patent are incorporated herein by reference thereto.

In particular, this apparatus thus includes a main frame 1 having a bed 3 vertically slidably movable therein, in accordance with the description contained in said U.S. Pat. No. 3,045,103. The armature holding and indexing mechanism utilized in this apparatus is generally designated 5, and includes a shaft 7, on which is mounted a clutch 9 which has a socket in which is releasably clamped one end of the armature commutator shaft, which is itself journaled in a bearing 11 on bed 3, and the clutch mechanism itself can be manually operated by a lever 13 pivoted on bed 3 at pivot 15. A pair of rests 17 is also mounted on bed 3 in order to support the armature in a horizontal position so it can be rotated for indexing the commutator bars beneath electrode 19.

In particular, this may be accomplished by a suitable well-known pawl and ratchet mechanism 21 which rotates shaft 7 in a step-by-step manner.

By employing such a mechanism, it can be seen that the commutator C and its armature A are rotated in an interrupted manner or indexed so that the commutator bars successively move beneath electrode 19 so that the commutator wires can be fused to the commutator bars.

The apparatus includes a second electrode 25 which contacts the commutator bar simultaneously with electrode 19.

The particular apparatus utilized to reciprocate the electrodes to and from contact with the armature and commutator assembly will not be reviewed in detail, but again is specifically incorporated herein by reference to U.S. Pat. No. 3,045,103, which details one such apparatus. This patent also details one mechanism for opening and closing the fusing circuit for initiation and termination of the welding operation at electrode 19.

In accordance with the present invention, a fiber optic probe 31 is employed for the transmission of infrared energy generated at the point where the armature wires and commutator bars are to be joined, to a photon detector. The fiber optic probe 31 is mounted on an aiming bracket 33 including a lens system for acceptance of the energy transmitted from the commutator bar at a point relative to the joint, as shown in FIGS. 3 A through D. The aiming bracket 33 is itself mounted with respect to the overall fusing or brazing apparatus, so that it may be aimed at that point relative to the joint to be formed. The end of the fiber optic probe 31, which may be of any desired length, is attached to the electronic processing unit 34. The contents of this unit may be more easily understood with reference to the schematic drawing shown in FIG. 2.

Thus, the fiber optic probe 31 is aimed directly at a point relative to the joint between the armature wires and commutator bars and collects the infrared radiation emitted from that target area, and transmits that energy, by a process of multiple internal reflections, to the remotely mounted photon detector 37 contained in the electronic processing unit 34. The fiber optic probe 31 itself is well-known in the art, and employs an optical core coated with a material having a lower refractive index in order to enable the efficient transmission of infrared radiation from the heat source to the photon detector 37. Such fiber optic means are therefore capable of detecting such energy emitted from the heated metal surface even if this energy has not reached the wave length of visible light. This of course permits the extreme accuracy with which the present invention operates. The applicant of course does not contend that he has invented fiber optic probes. Indeed, such apparatus are currently commercial articles of commerce. It is however the application of these probes to the present apparatus for fusing or brazing armature wires to commutator bars in the manner required herein which constitutes applicant's invention.

In any event, the fiber optic probe 31 of this invention as shown in FIG. 1 includes a pair of fiber optic paths, as shown in the bifurcated fiber optic probe 31 in paths 31 A and 31 B. Clip 31 C indicates the point where the two paths actually separate with respect to each other. In this manner, one of the two fiber optic paths 31 A can be used for the collection and transmittal of the energy emitted, while the other path 31 B can be utilized in connection with a lamp or light source 38 (FIG. 2) contained in the electronic processing unit 34, so that on actuation of this light source light is transmitted through the fiber optic probe 31, and out from the aiming bracket 33 directly onto the commutator bar in order to assist in aiming this device.

Again, such bifurcated fiber optic probes are commercial articles of commerce, and are specifically being produced commercially by Banner Engineering Corporation of Minneapolis, Minn. and Keystone Optical Fibers, Inc. of Norwood, Mass.

The energy thus collected by the fiber optic probe 31 is initially chopped or modulated in chopper 39, of known configuration, prior to reaching the photon detector 37. This is carried out to insure optimum performance from the photon detector and to eliminate background temperature variations which could adversely effect the accuracy of the measurement finally obtained. Photon detector 37, which is also well-known apparatus, converts the radiant energy received from the fiber optic probe 31 to a proportional AC electronic signal. Solid state electronics are, of course, preferred in order to insure accuracy and reliability therein. This AC electronic signal then passes through AC amplifier 41, and demodulator or rectifier 43, to convert the signal back into direct current. All of this comprises a portion of the analog processor. A voltage source 45 is then employed in order to represent a preselected peak temperature setting which is selected by a dial 46 on the front of the electronic processing unit 34, in accordance with the fusing or brazing operation which is to be carried out. Comparator 47 thus compares the signal obtained from rectifier 43 with that from the voltage source 45, to determine when the peak temperature has been obtained. When that peak temperature has been obtained, i.e., the signal from the rectifier 43 equals that from voltage source 45, peak latching circuit or switch 51 is activated. This automatically activates a peak lamp driver 55 so that a visible light is activated on the front panel of the electronic processing unit 34 or elsewhere to visually indicate that this peak temperature has been obtained. Simultaneously, activation of peak latching circuit 51 also activates temperature shutoff driver 53, i.e., in order to terminate the power source for the electrodes 19 and 25, and therefore terminate the fusing operation. This may be accomplished by activating a light source, such as a light emitting diode, and including a photocell device in the shutoff mechanism so that activation of the light source simultaneously activates the photocell device. The output from this photocell device can then be directly attached to the contactors for the fusing apparatus itself so that activation of the light terminates the conduction of the current through these contactors.

Furthermore, activation of the peak latching circuit 51 in the manner described above will also activate an index driver 66. That is, this is merely a relay device for controlling the mechanical functions of the machine. In this manner the commutator can be indexed to its next position, etc. That is, while normally this index driver 66 can be deleted, i.e., the machine automatically indexes to its next commutator segment, it is possible to include such an index driver so that the machine will only index to the next commutator bar if the peak temperature has been reached, and if not, no indexing will occur.

At the same time, a timing control mechanism is also built into the electronic processing unit 34. A time limit is thus placed on the amount of time which can be utilized after activation of the electrodes before the voltage representing the peak temperature setting is actually reached. The operation of the fusing or brazing machine will thus be terminated prior to the reaching of the peak temperature setting if the preselected time is first reached. This is accomplished by setting the cycle timer 59, i.e., the desired time period is selected in cycles by a two-digit thumb wheel switch 58, again located at the front of the electronic processing unit 34. If the cycle time is reached prior to attaining the peak temperature set by voltage source 45, alarm arming circuit 61 will be actuated. Thus, if the alarm arming circuit 61 is activated prior to the peak latching circuit 51, the alarm arming circuit 61 will disarm or override peak latching circuit 51. Simultaneously, the alarm circuit 61 will activate an alarm time-out driver 63, to activate an audible alarm and to terminate the brazing or fusing operation in the same manner as temperature shut-off drive 53. If, however, the peak latching circuit 51 is activated prior to the alarm arming circuit 61, that is the required temperature is reached prior to the time period set in cycle timer 59, then peak latching circuit 51 will disarm the alarm arming circuit 61. Finally, if the cycle timer 59 activates the alarm arming circuit prior to activation of the peak latching circuit 51, and therefore the alarm arming circuit 61 disarms or shuts off the peak latching circuit 51, then the entire thermal monitoring system must be restarted, and the peak latching circuit 51 reset by means of an outside signal 68 from the fusing or brazing machine itself.

Figure 2:
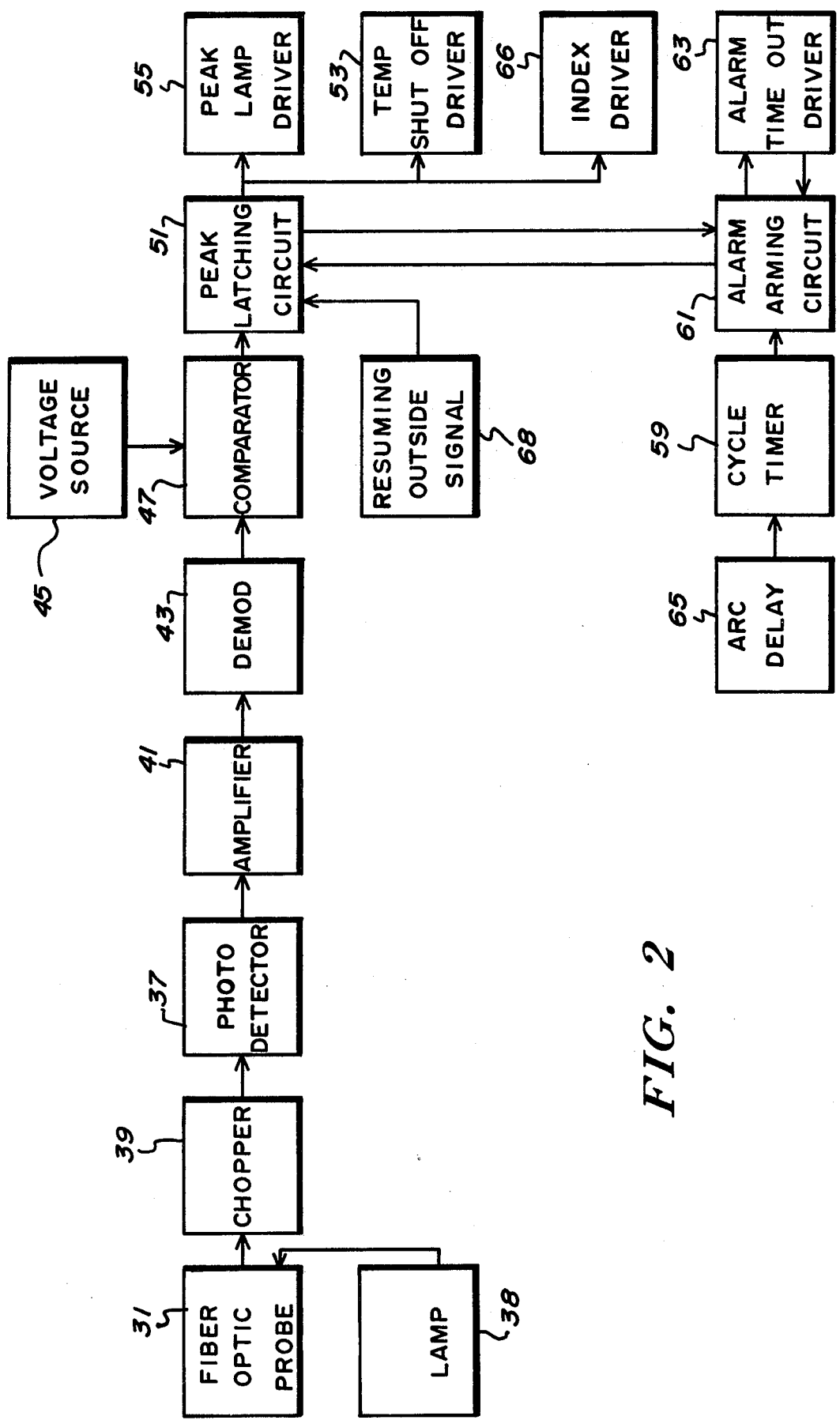
FIG. 2 is a schematic diagram of the apparatus of the present invention for controlling a fusing or brazing machine.

In FIG. 2, an arc delay 65 is also shown. This device is employed to retard the actual activation of the thermal monitoring control system itself, i.e. the cycle timer, for a short period, usually representing one or two cycles. The reason for this apparatus is that in some cases as the electrodes contact the surface of the commutator bar, a short term arc may be produced. In that case, the arc produces an abnormal temperature reading, and therefore it is desirous that this temperature not be read and therefore the delay period is built in by arc delay mechanism 65.

It should also be noted at this point that there are commercial thermal monitoring units which are employed in various apparatus for controlling that equipment in response to electronic signals. These monitors, which of course do not include any fiber optics and/or photon detectors such as those utilized in accordance with the present invention, are presently sold by a number of companies, including Princeton Applied Research Corporation of Princeton, N.J.; Mikron Instrument Company, Inc. of Ridgewood, N.J.; Sensors, Inc. of Ann Arbor, Mich.; and Barnes Engineering Company of Stamford, Conn.

It should also be noted that the point relative to the joint between the armature wires and commutator bars at which the fiber optic probe 31 is aimed is critical. Preferably, the fiber optic probe 31 is precisely aimed at the commutator just below the high resistance electrode. The probe should not, however, ever be aimed directly at the electrode itself because of the high intensity heat generated at that point, which would not be representative of the heat dissipation into the fused or brazed joint, and would therefore provide very little quality control over that joint. In this regard reference is thus made to FIGS. 3 A through D. FIG. 3 A shows a portion of the commutator bar of a tang type commutator. The tang 70 thus extends in a U-shaped configuration from the surface of the commutator bar 72. The armature wire 74 thus extends through the slot of the tang 70 for fusing or brazing purposes. That operation is thus accomplished by placement of the fusing electrode 19 on the tang as shown, and placement of the ground electrode 25 on the surface of the commutator bar 72. The figure also shows schematically the connection between these electrodes through the fusing transformer. Thus, in normal operation, the fusing electrode comprises a high resistance alloy, while the ground electrode comprises a low resistance alloy. In any event, the point 75 shown in FIG. 3 A at which the fiber optic probe 31 is aimed is again quite essential to the careful control and operation of this apparatus. That point is displaced from the fusing electrode itself, but is at a point relative to the location of the fuse between the armature wire and tang on the commutator bar 72. Reference is thus also made to FIG. 3 B, which shows the same relationship, although electrodes are merely shown schematically therein, with respect to a flush slotted type commutator bar 76. In this case the armature wires 77 are placed in the slot 78 for fusing at the joint shown at 79. In this case the slot 75 for preferably aiming of the fiber optic probe 31 is also shown at a point displaced from the fusing electrode. Finally, with reference to FIGS. 3 C and 3 D, the commutator bar 80 of a riser slotted type commutator is also shown in a similar drawing. In this case armature wires 81 are placed in slot 83, and again the preferred target area 75 is also shown therein. The setting of this target area is fascilitated by use of the bifurcated fiber optic probe as discussed previously. Thus a light source can be shown directly on target area 75 for alignment of the fiber optic probe 31 so that the path of the fiber optic probe which collects the radiant energy transmitted during fusing will also be aimed directly at that target area 75.

While I have shown and described the preferred embodiment of this invention, it should be understood that this is primarily for the purposes of illustrating the principles of this invention, and that many modifications and changes can be made in the construction of the apparatus by those skilled in the art while remaining within the spirit and scope of this invention.

What is claimed is:

1. Apparatus for controlling the quality of a joint between an armature wire and a commutator bar which comprises means for heating said armature wire and said commutator bar at the point where they are to be joined, means for bringing said armature wire and commutator bar into contact with said heating means so as to form said joint, fiber optic means for collecting radiant energy emitted from a point relative to said joint and displaced from said heating means as said joint is being heated, said fiber optic means including illumination means for emitting light, a bifurcated fiber optic assembly having a first path and a second path, said first path for collecting said radiant energy and said second path for directing said light emitted by said illumination means onto said point relative to said joint so as to aid in aiming said fiber optic means, and a lens system for concentrating said light on said point and for limiting collection of radiant energy to that energy emitted from said point, means for converting said radiant energy into a usable electronic signal representative of the temperature of said joint, means for terminating operation of said heating means, and means for actuating said terminating means, said actuating means being operative in response to said electronic signal when said temperature at said joint reaches a predetermined temperature.

2. The apparatus of claim 1 wherein said heating means comprises a pair of electrodes, including a fusing or brazing electrode and a ground electrode.

3. The apparatus of claim 1 including timing means for measuring the length of time said armature wire and said commutator bar have been in contact with said heating means, and wherein said actuating means is also operative when said length of time reaches a predetermined length of time.

4. The apparatus of claim 3 including means for resetting said timing means when said temperature at said joint reaches said predetermined temperature prior to expiration of said predetermined length of time.

5. The apparatus of claim 3 including alarm means, wherein said alarm means is actuated when said length of time reaches a predetermined length of time.

6. The apparatus of claim 1 wherein said converting means includes photon detection means for converting the radiant energy collected by said fiber optic means into an electronic impulse.

7. The apparatus of claim 1 wherein said actuating means includes analog computer means for comparing said usable electronic signal with a reference electronic signal.

* * * * *